United States Patent [19]

Salasoo

[11] Patent Number: 5,627,709
[45] Date of Patent: May 6, 1997

[54] ELECTRICAL CIRCUIT FOR PROTECTING A SUPERCONDUCTING MAGNET DURING A QUENCH

[75] Inventor: Lembit Salasoo, Schenectady, N.Y.

[73] Assignee: General Electric Company, Schenectady, N.Y.

[21] Appl. No.: 514,332

[22] Filed: Aug. 11, 1995

[51] Int. Cl.$^6$ ............................................. H02H 7/00
[52] U.S. Cl. ............................ 361/19; 361/93; 361/115
[58] Field of Search .............................. 361/19, 93, 115

[56] References Cited

U.S. PATENT DOCUMENTS

| | | | |
|---|---|---|---|
| 3,925,707 | 12/1975 | Bhate et al. | 361/19 |
| 4,528,532 | 7/1985 | Keim | 335/216 |
| 4,586,017 | 4/1986 | Laskaris et al. | 338/32 S |
| 4,764,837 | 8/1988 | Jones | 361/19 |
| 4,956,740 | 9/1990 | Williams | 361/19 |
| 4,977,039 | 12/1990 | Onishi et al. | 361/19 |
| 5,410,288 | 4/1995 | Dorri et al. | 335/216 |

OTHER PUBLICATIONS

Concurrently filed U.S. Patent Application RD–24556, by Lembit Salasoo et al., entitled "A Method for Making an Electrical Coil".

Concurrently filed U.S. Patent Application RD–24491, by Lembit Salasoo et al., entitled "Superconducting Switch".

*Primary Examiner*—Jeffrey A. Gaffin
*Assistant Examiner*—Stephen W. Jackson
*Attorney, Agent, or Firm*—Douglas E. Erickson; Marvin Snyder

[57] ABSTRACT

A superconductive-magnet electrical circuit for protecting a superconductive magnet from damage during a quench in the superconductive magnet coil assemblage. A first circuit portion detects the quench. A pilot superconductive switch has its superconductive wire portion superconductively coupled in series with the coil assemblage and has its resistive heater portion, which is activated by the first circuit portion, located near the superconductive wire portion. A second circuit portion (such as a resistive heater or an energy dump resistor) quench protects the coil assemblage and is triggered by the superconductive wire portion switching from the superconductive to the resistive mode.

8 Claims, 2 Drawing Sheets

ELECTRICAL CIRCUIT FOR PROTECTING A SUPERCONDUCTING MAGNET DURING A QUENCH

BACKGROUND OF THE INVENTION

The present invention relates generally to superconductive magnets and more particularly to an electrical circuit which protects a superconductive magnet from damage during a quench (i.e., a spontaneous loss of superconductivity).

Superconducting magnets are those superconducting devices which have a main superconductive coil assemblage and include, but are not limited to, magnetic resonance imaging (MRI) systems for medical diagnosis, superconductive rotors for electric generators and motors, and magnetic levitation devices for train transportation. Superconductive devices usually employ a superconductive switch to transfer between a persistent superconducting operating mode and a non-persistent superconducting operating mode. Typically a superconductive switch is used to start up superconductive operation of the superconductive device and to purposely run down such superconductive operation.

Known superconductive switches are placed in a cryogenic region (i.e., within the cryostat) of the superconductive device where the operating temperature is less than or equal to the critical temperature of the superconductor material used in the main superconductive coil assemblage of the superconductive device. Such a superconductive switch typically has a superconductive coil portion and an electrical heater portion. The coil wire of the superconductive coil portion is wound in a two-in-hand bifilar manner (i.e., adjacent turns in the same layer of coil wire, or the turns in adjacent layers of coil wire, are wound alternately clockwise and counterclockwise as one travels along and between the two ends of the coil wire) for low inductance and has a heavy grade of electrical insulation for adequate voltage standoff capability to meet the switch's design peak terminal voltage. Activation of the electrical heater portion raises the temperature in the superconductive coil portion above the critical temperature.

Quench protection techniques for superconductive devices include techniques for preventing (or delaying) an impending quench and techniques for preventing (or limiting) harm to the superconductive device that is undergoing a quench. Such harm is from damaging high temperatures and high stresses applied locally to the magnet at the quench site. Known techniques for preventing (or limiting) such harm seek to avoid excessive localized heat energy deposition in the superconducting winding and include using a quench-detection signal (from the electrical center of the main superconductive coil assemblage of the superconductive device) directly supplying an energy dump resistor or directly powering a wide-area electrical heater located near the main superconductive coil assemblage of the superconductive device. Such known techniques take a relatively long time to work. It is also known to amplify the quench-detection signal outside the cryostat, but this raises issues of reliability and additional cryostat penetrations.

SUMMARY OF THE INVENTION

It is an object of the invention to provide an electrical circuit which protects a superconductive magnet from damage during a quench.

The superconductive-magnet electrical circuit of the invention includes a superconductive magnet coil assemblage, a first circuit portion, a pilot superconductive switch, and a second circuit portion. The first circuit portion detects a magnet quench in the superconductive magnet coil assemblage. The pilot switch has a pilot-switch superconductive wire portion and a pilot-switch resistive heater portion. The wire portion is superconductively coupled in series with the coil assemblage. The heater portion is activated by the first circuit portion and is located proximate the wire portion for switching the wire portion from a superconductive operating mode to a resistive operating mode. The second circuit portion quench protects the coil assemblage and is triggered by the wire portion switching from the superconductive operating mode to the resistive operating mode.

Several benefits and advantages are derived from the invention. The superconductive-magnet electrical circuit does not require any additional cryostat penetrations. When the pilot superconductive switch becomes resistive, it acts to amplify the detection of the magnet quench by the first circuit portion, such amplification being used by the second circuit portion to quickly protect the coil assemblage from damage due to the quench.

BRIEF DESCRIPTION OF THE DRAWINGS

The accompanying drawings illustrate several preferred embodiments of the present invention wherein.

DETAILED DESCRIPTION OF THE INVENTION

Figure 1:
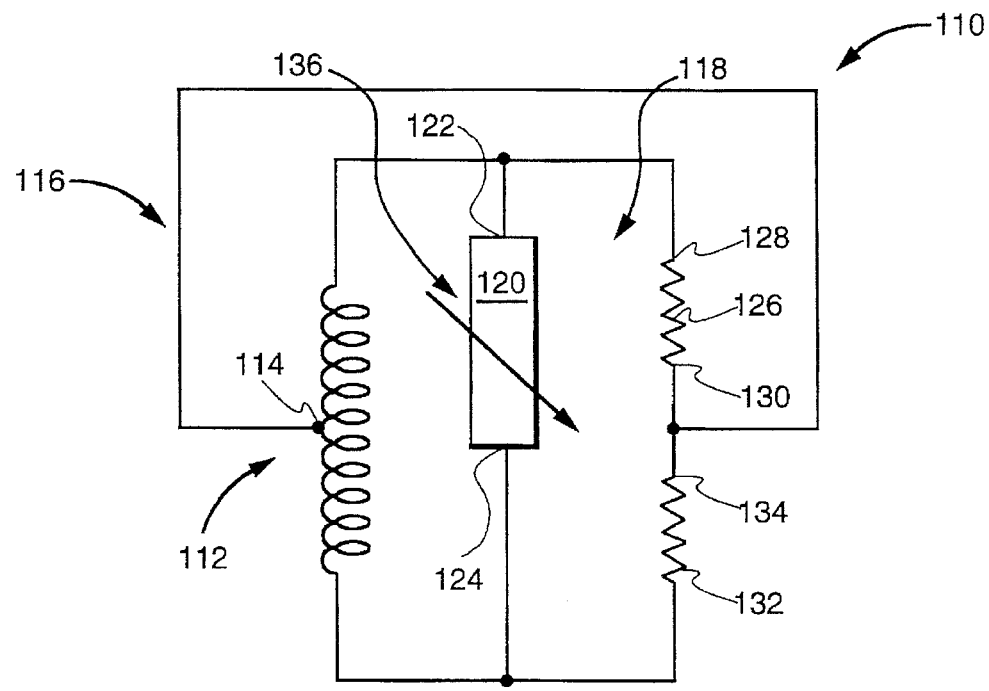
FIG. 1 is a schematic circuit diagram of a first preferred embodiment of the superconductive-magnet electrical circuit wherein a heat pulse from the pilot-switch superconductive wire portion quickly and uniformly warms the entire coil assemblage thereby avoiding damage from the localized quench of the coil assemblage.
Figure 2:
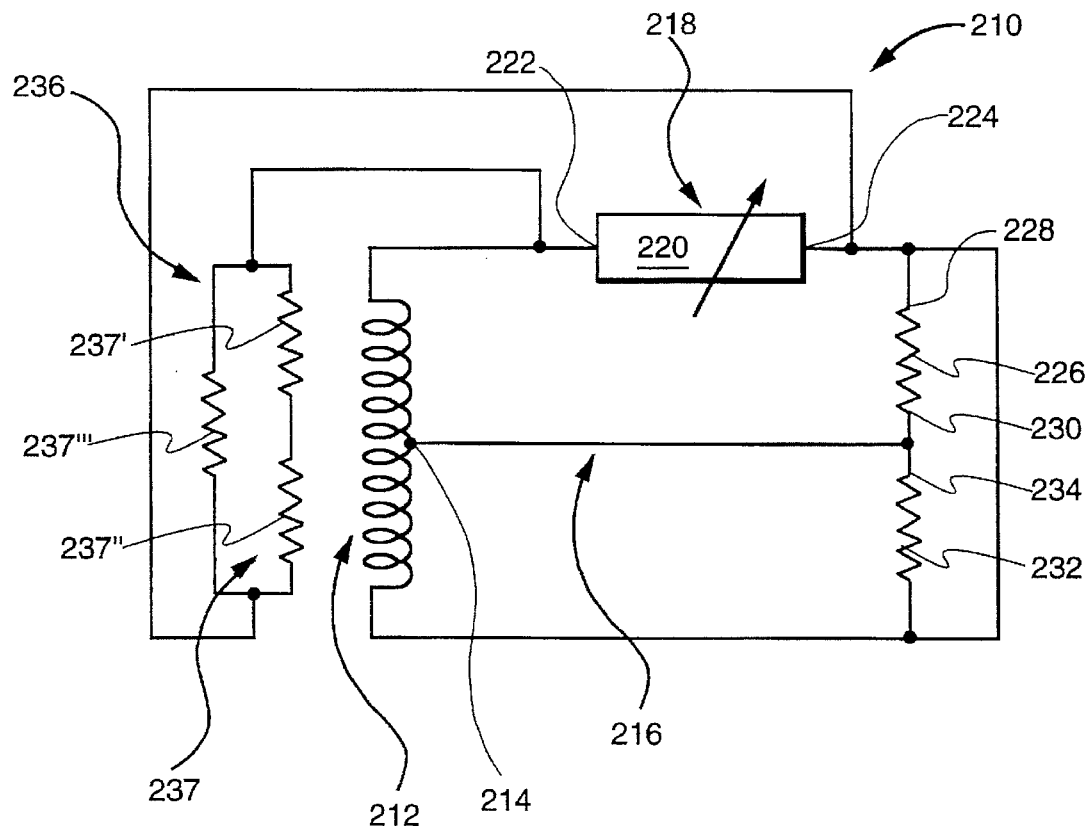
FIG. 2 is a schematic circuit diagram of a second preferred embodiment of the superconductive-magnet electrical circuit wherein a quench-protection resistive heater quickly and uniformly warms the entire coil assemblage thereby avoiding damage from the localized quench of the coil assemblage.
Figure 3:
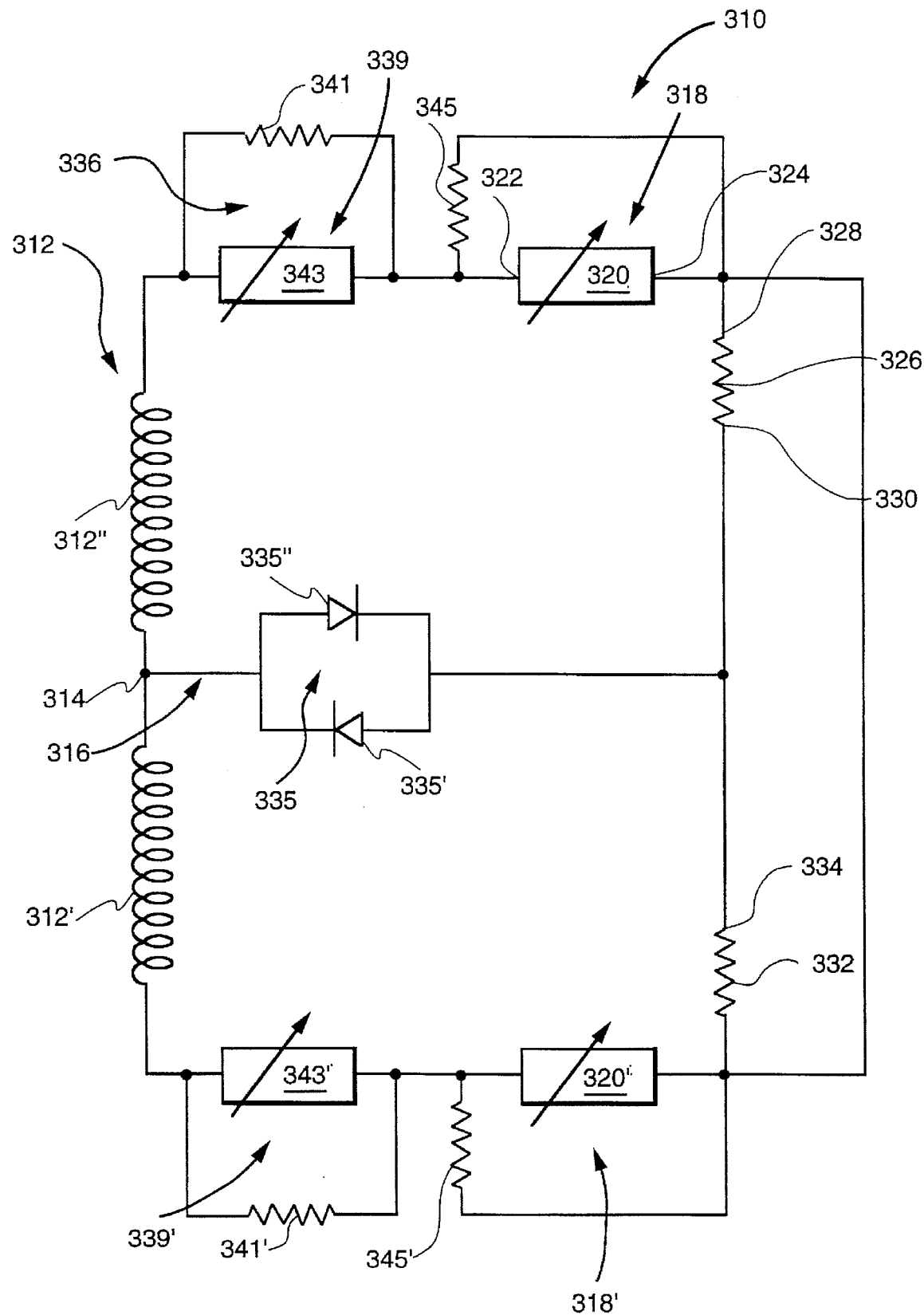
FIG. 3 is a schematic circuit diagram of a third preferred embodiment of the superconductive-magnet electrical circuit wherein an energy dump resistor quickly dissipates the electrical energy in the coil assemblage thereby avoiding damage from the localized quench of the coil assemblage.

Referring now to the drawings, FIGS. 1–3 each show a different preferred embodiment of the superconductive-magnet electrical circuit 110, 210 and 310 of the present invention which preferably is disposed totally within the cryostat of the corresponding superconducting magnet (not shown). The superconductive-magnet electrical circuit 110, 210 and 310 includes a superconductive magnet coil assemblage 112, 212 and 312 which is shown as a single coil in FIGS. 1 and 2 and as two separate coils in FIG. 3. In an exemplary embodiment, the coil assemblage 112, 212 and 312 includes conventional coil windings of a stabilized and insulated superconductive wire or tape comprising, for example, niobium-tin. The coil assemblage 112, 212 and 312 has an electrical center 114, 214 and 314, as can be appreciated by those skilled in the art.

The electrical circuit 110, 210 and 310 also includes means 116, 216 and 316 for detecting a magnet quench in the superconductive magnet coil assemblage 112, 212 and 312 and further includes a pilot superconductive switch 118, 218 and 318. The pilot superconductive switch 118, 218 and 318 includes a pilot-switch superconductive wire portion 120, 220 and 320 superconductively coupled in series with the superconductive magnet coil assemblage 112, 212 and 312 and having a superconductive operating mode and a resistive operating mode. It is noted that the pilot-switch superconductive wire portion 120, 220 and 320 has first and second ends 122 & 124, 222 & 224 and 322 & 324. The pilot superconductive switch 118, 218 and 318 also includes a pilot-switch resistive heater portion 126, 226 and 326 activated by the quench-detecting means 116, 216 and 316 and disposed proximate the pilot-switch superconductive wire portion 120, 220 and 320 for switching the pilot-switch superconductive wire portion 120, 220 and 320 from the superconductive operating mode to the resistive operating mode.

Preferably, the quench-detecting means 116, 216 and 316 includes the pilot-switch resistive heater portion 126, 226 and 326 having: a first lead 128, 228 and 328 electrically coupled in series with one of the first and second ends 122 & 124, 222 & 224 and 322 & 324 of the pilot-switch superconductive wire portion 120, 220 and 320; a second lead 130, 230, 330 electrically coupled in series with generally the electrical center 114, 214 and 314 of the superconductive magnet coil assemblage 112, 212 and 312; and having a cold resistance value during superconductive operation of the superconductive magnet coil assemblage 112, 212 and 312. Preferably, the quench-detecting means 116, 216 and 316 also includes a balance resistor 132, 232 and 332 having a cold resistance equal to generally the cold resistance value of the pilot-switch resistive heater portion 126, 226 and 326 and having a first lead portion 134, 234 and 334 electrically coupled in series with the second lead 130, 230 and 330 of the pilot-switch resistive heater portion 126, 226 and 326. To block low voltage level signals from the pilot-switch resistive heater portion 126, 226 and 326 and thereby eliminate false triggering signals in an electromagnetically noisy magnet environment, the quench-detecting means 116, 216 and 316 preferably further includes a pair of opposing diodes 335' and 335" (seen only in FIG. 3) electrically coupled together in parallel and electrically coupled in series between and with generally the electrical center 114, 214 and 314 of the superconductive magnet coil assemblage 112, 212 and 312 and the pilot-switch resistive heater portion 126, 226 and 326. Other such quench-detecting means (not shown in the figures) include: connection of the second lead of the pilot-switch resistive heater portion to an intermediate part of the superconductive magnet coil assemblage substantially different from the electrical center, connecting the first lead of the balance resistor to the same part of the superconductive magnet coil assemblage, and adjusting the resistance of the balance resistor to a value not equal to the pilot-switch resistive heater portion, the value being chosen to compensate for the deviation from the electrical center of the coil assemblage connection; a combination of more than one coil assemblage connection, each at an electrically distinct part of the coil assemblage and each with its own circuit of pilot-switch heater portion and balance resistor; a resistive search coil coupled magnetically to the coil assemblage, the voltage signal from which is combined with the magnet terminal voltage to indicate the presence of resistance rising from a quench zone in the coil assemblage; and the like; as can be appreciated by those skilled in the art.

The electrical circuit 110, 210 and 310 additionally includes means 136, 236 and 336 for quench protecting the superconductive magnet coil assemblage 112, 212 and 312, the quench-protecting means 136, 236 and 336 triggered by the pilot-switch superconductive wire portion 120, 220 and 320 switching from the superconductive operating mode to the resistive operating mode. In a first preferred construction, the pilot-switch superconductive wire portion 120 generates a heat pulse in switching from the superconductive operating mode to the resistive operating mode and, as seen only in the superconductive-magnet electrical circuit 110 of FIG. 1, the quench-protecting means 136 includes the pilot-switch superconductive wire portion 120 disposed proximate the superconductive magnet coil assemblage 112. In operation, a localized magnet quench in the superconductive magnet coil assemblage 112 is detected as a voltage imbalance which activates the pilot-switch resistive heater portion 126 which triggers the pilot-switch superconductive wire portion 120 to switch from the superconductive operating mode to the resistive operating mode thereby generating a heat pulse to quickly and uniformly heat the entire superconductive magnet coil assemblage 112 to prevent damage thereto from the localized quench, as can be appreciated by those skilled in the art.

In a second preferred construction, seen only in the superconductive-magnet electrical circuit 210 of FIG. 2, the quench-protecting means 236 includes a quench-protection resistive heater 237 disposed proximate the superconductive magnet coil assemblage 212 and electrically coupled in parallel with the pilot-switch superconductive wire portion 220. In an exemplary embodiment, the quench-protection resistive heater 237 includes a pair of resistive sub-heaters 237' and 237", electrically coupled together in series and disposed proximate the ends of the superconductive magnet coil assemblage 212, and further includes a third resistive sub-heater 237'" electrically coupled in parallel with the sub-heater pair 237' and 237" and disposed proximate the middle of the superconductive magnet coil assemblage 212. In operation, a localized magnet quench in the superconductive magnet coil assemblage 212 is detected as a voltage imbalance which activates the pilot-switch resistive heater portion 226 which triggers the pilot-switch superconductive wire portion 220 to switch from the superconductive operating mode to the resistive operating mode thereby directing electrical current to the quench-protection resistive heater 237 which quickly and uniformly heats the entire superconductive magnet coil assemblage 212 to prevent damage thereto from the localized quench, as can be understood by the artisan.

In a third preferred construction, seen only in the superconductive-magnet electrical circuit 310 of FIG. 3, the quench-protecting means 336 includes a dump-resistor superconductive switch 339 and an energy dump resistor 341. The dump-resistor superconductive switch 339 has a dump-resistor-switch superconductive wire portion 343, superconductively coupled in series with the superconductive magnet coil assemblage 312 (which includes two generally identical coils 312' and 312") and the pilot-switch superconductive wire portion 320, and has a dump-resistor-switch resistive heater portion 345 disposed proximate the dump-resistor-switch superconductive wire portion 343 and electrically coupled in parallel with the pilot-switch superconductive wire portion 320. The energy dump resistor 341 is electrically coupled in parallel with the dump-resistor-switch superconductive wire portion 343. Preferably, the electrical resistance of the energy dump resistor 341 is greater than the electrical resistance of the dump-resistor-switch resistive heater portion 345. In operation, a localized magnet quench in the superconductive magnet coil assemblage 312 is detected as a voltage imbalance which activates the pilot-switch resistive heater portion 326 which triggers the pilot-switch superconductive wire portion 320 to switch from the superconductive operating mode to the resistive operating mode thereby directing electrical current to the dump-resistor-switch resistive heater portion 345 which changes the dump-resistor-switch superconductive wire portion 343 from superconductive to resistive which quickly directs electrical current to the energy dump resistor 341 and away from the superconductive magnet coil assemblage 312 thereby preventing damage thereto from the localized quench, as can be appreciated by the artisan. It is noted that the superconductive-magnet electrical circuit 310 preferably includes, in mirror-image relationship, a second pilot superconductive switch 318' (having a pilot-switch superconductive wire portion 320' and having a pilot-switch resistive heater portion which is the balance resistor 332), a second dump-resistor superconductive switch 339' (having a dump-resistor-switch superconductive wire portion 343' and having a dump-resistor-switch resistive heater portion 345'), and a second energy dump resistor 341', as can be seen from FIG. 3.

Other quench-protecting means (not shown in the figures) include: creation of one or more normal zones in the coil assemblage by varying the local magnetic field through changing energization of one or more current coils; inducing a jet of flow of warm cryogen over all or part of the coil assemblage; rapid removal of cryogen from contact with the coil assemblage; and control of a connected electrical power supply to reduce magnet current; and the like; as can be appreciated by those skilled in the art.

Thus, it is seen that the superconductive-magnet electrical circuit 110, 210 and 310 of the present invention utilizes a low-energy actuating signal from the quench-detecting means 116, 216 and 316 to trigger a pilot superconductive switch 118, 218 and 318, which is in series with the superconductive magnet coil assemblage 112, 212 and 312, thereby providing a rapid amplification of the actuating signal. The amplified signal is then used to quickly trigger the quench-protecting means 136, 236 and 336 (such as, but not limited to, a quench-protection resistive heater 237 to uniformly heat the entire superconductive magnet coil assemblage 112, 212 and 312 or an energy dump resistor 341 to draw electrical current away from the superconductive magnet coil assemblage 112, 212 and 312) to avoid damaging localized heat energy deposition in the superconductive magnet coil assemblage 112, 212 and 312. It is noted that, in many MRI superconducting magnets, quench protection must operate in approximately two seconds after the localized magnet quench spontaneously starts. However, the potentially-damaging temperatures and stresses applied by the localized quench to the superconductive magnet coil assemblage 112, 212 and 312 increase very rapidly with increasing protection system operating time so that every tenth of a second speed-up in the protection system operation provides a significant benefit in avoiding damage to the superconductive magnet coil assemblage 112, 212 and 312. The superconductive-magnet electrical circuit 110, 210 and 310 of the present invention, which may be wholly self-contained within the magnet cryostat, provides reliable, fast-acting quench protection with low actuation energy.

In a first exemplary embodiment, the pilot-switch superconductive wire portion 120, 220 and 320 has 16 feet of superconducting wire so it requires little heat deposition (e.g., below one Joule) from the pilot-switch resistive heater portion 126, 226 and 326 in order become resistive. When the pilot-switch superconductive wire portion 120, 220 and 320 becomes resistive, it generates heat from the magnet current (which in MRI applications may range between generally 100 and 1000 amperes) and dissipates, for example, 375 watts. Thus the pilot superconductive switch 118, 218 and 318 amplifies a low-energy heater signal to a high power pilot switch heating rate which is used by the quench-protecting means 136, 236 and 336 (such as, for example, by the quench-protection resistive heater 237 or by the energy dump resistor 341). The pilot superconductive switch 118, 218 and 318 is made, in one enablement, as follows. Eight turns of 0.030×0.050-inch insulated niobium-titanium superconductor with 1.3:1 copper-to-superconductor ratio and copper residual resistivity ratio of 70 are wound onto a 4.2-inch diameter fiberglass composite coil form 0.45-inch long with flanges. Interlayer fiberglass cloth is laid down on top of the superconductor layer in a manner well known to those practiced in the art. One 12"×0.4" 24 Ohm polyimide-insulated etched foil heater is laid over the fiberglass layer and the heater electrical leads are led out along the side of the flange. Another layer of fiberglass cloth is laid over the heater and then eight turns of the superconductor are layer-wound over the top. The superconductor start and finish leads are brought out of the package, and several fiberglass cloth layers are wound over the top superconductor layer. The whole assembly is then completed by vacuum-pressure-impregnation with epoxy resin and cured in a manner well known to the artisan. The superconductor may be wound in a bifilar manner to reduce pilot switch inductance.

In a second exemplary embodiment, the dump-resistor superconductive switch 339 includes: a coil form; first, second, and third layers of an electrically-insulated, stabilized superconductive coil wire; a first electrically-insulated, electrical heater; and a first stratum of electrical insulation. The coil form includes a generally cylindrical shaft having a generally longitudinally extending axis, first and second ends, a middle located generally equidistant from the ends, and clockwise and counterclockwise directions about the axis around the shaft. The first layer of the coil wire is circumferentially wound around the shaft in the clockwise direction from the first end to the middle and in the counterclockwise direction from the middle to the second end. The second layer of the coil wire is circumferentially wound around the first layer in the clockwise direction from the first end to the middle and in the counterclockwise direction from the middle to the second end. The third layer of the coil wire is circumferentially wound around the second layer in the counterclockwise direction form the first end to the middle and in the clockwise direction from the middle to the second end. The first electrical heater is located between the first and second layers, and the first stratum of electrical insulation is separate from that of the coil wire and is located between the second and third layers. The switch's coil winding pattern together with the first stratum of electrical insulation attains a desired voltage standoff capability for the switch without the need for heavy electrical insulation of the coil wire. The lighter electrical insulation used for the electrically-insulated coil wire does not compromise switch thermal conduction and quench propagation. It is noted that, preferably, the energy dump resistor 341 has essentially the same construction, and is made in essentially the same way, as the dump-resistor superconductive switch 339, but with a resistive wire portion and without an electrical heater.

A preferred method for making the dump-resistor superconductive switch 339 includes the steps of obtaining a generally cylindrical shaft having a middle, attaching a radially-extending pin to the shaft generally at the middle, obtaining a length of stabilized, electrically-insulated superconductive coil wire having a midportion generally equidistant from two reference points, winding a first portion of the coil wire around a first rotatable supply spool, winding a second portion of the coil wire around a second rotatable supply spool, and looping the midportion of the coil wire around the pin. The method also includes the step of rotating the shaft in one direction and guiding the coil wire such that a first segment of the coil wire is paid out from the first supply spool and wound around the shaft generally from the middle to the first end and such that a first section of the coil wire is paid out from the second supply spool and wound around the shaft generally from the middle to the second end. The method additionally includes the step of continuing to rotate the shaft in the one direction and guiding the wire such that a second segment of the coil wire is paid out from the first supply spool and wound around the first segment of the wound coil wire generally from the first end to the middle and such that a second section of the coil wire is paid out from the second supply spool and wound around the first section of the wound coil wire generally from the second end to the middle. The method next includes the step of crossing over the coil wire from the first supply spool and the coil wire from the second supply spool generally at the middle and then includes the step of continuing to rotate the shaft in the one direction and guiding the coil wire such that a third segment of the coil wire is paid out from the first supply spool and wound around the second section of the wound coil wire generally from the middle to the second end and such that a third section of the coil wire is paid out from the second supply spool and wound around the second segment of the wound coil wire generally from the middle to the first end. The method of the invention includes, between the first and second segment/section winding steps, the step of placing a first electrical heater on the first segment and the first section of the wound coil wire and further includes, between the second and third segment/section winding steps, the step of placing a first stratum of electrical insulation, separate from that of the coil wire, on the second segment and the second section of the wound coil wire. Additional electrical insulation may be added around the coil wire at the crossover.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

I claim:

1. A superconductive-magnet electrical circuit comprising:

a) a superconductive magnet coil assemblage;

b) means for detecting a magnet quench in said superconductive magnet coil assemblage;

c) a pilot superconductive switch including:

(1) a pilot-switch superconductive wire portion superconductively coupled in series with said superconductive magnet coil assemblage and having a superconductive operating mode and a resistive operating mode; and (2) a pilot-switch resistive heater portion activated by said quench-detecting means and disposed proximate said pilot-switch superconductive wire portion for switching said pilot-switch superconductive wire portion from said superconductive operating mode to said resistive operating mode; and d) means for quench protecting said superconductive magnet coil assemblage, said quench-protecting means triggered by said pilot-switch superconductive wire portion switching from said superconductive operating mode to said resistive operating mode, wherein said pilot-switch superconductive wire portion generates a heat pulse in switching from said superconductive operating mode to said resistive operating mode and wherein said quench-protecting means includes said pilot-switch superconductive wire portion disposed proximate said superconductive magnet coil assemblage.

2. A superconductive-magnet electrical circuit comprising:

a) a superconductive magnet coil assemblage;

b) means for detecting a magnet quench in said superconductive magnet coil assemblage;

c) a pilot superconductive switch including:

(1) a pilot-switch superconductive wire portion superconductively coupled in series with said superconductive magnet coil assemblage and having a superconductive operating mode and a resistive operating mode; and (2) a pilot-switch resistive heater portion activated by said quench-detecting means and disposed proximate said pilot-switch superconductive wire portion for switching said pilot-switch superconductive wire portion from said superconductive operating mode to said resistive operating mode; and d) means for quench protecting said superconductive magnet coil assemblage, said quench-protecting means triggered by said pilot-switch superconductive wire portion switching from said superconductive operating mode to said resistive operating mode, and wherein said quench-protecting means includes:

(1) a dump-resistor superconductive switch having:

(a) a dump-resistor-switch superconductive wire portion superconductively coupled in series with said superconductive magnet coil assemblage and said pilot-switch superconductive wire portion; and (b) a dump-resistor-switch resistive heater portion disposed proximate said dump-resistor-switch superconductive wire portion and electrically coupled in parallel with said pilot-switch superconductive wire portion; and (2) an energy dump resistor electrically coupled in parallel with said dump-resistor-switch superconductive wire portion.

3. The circuit of claim 2, wherein the electrical resistance of said energy dump resistor is greater than the electrical resistance of said dump-resistor-switch resistive heater portion.

4. A superconductive-magnet electrical circuit comprising:

a) a superconductive magnet coil assemblage;

b) means for detecting a magnet quench in said superconductive magnet coil assemblage;

c) a pilot superconductive switch including;

(1) a pilot switch superconductive wire portion superconductively coupled in series with said superconductive magnet coil assemblage and having a superconductive operating mode and a resistive operating mode; and (2) a pilot switch resistive heater portion activated by said quench-detecting means and disposed proximate said pilot-switch superconductive wire portion for switching said superconductive wire portion from said superconductive operating mode to said resistive operating mode; and d) means for quench protecting said superconductive magnet coil assemblage, said quench-protecting means triggered by said pilot-switch superconductive wire portion switching from said superconductive operating mode to said resistive operating mode, wherein said superconductive magnet coil assemblage has an electrical center, wherein said pilot-switch superconductive wire portion has first and second ends, and wherein said quench detecting means includes:

(1) said pilot-switch resistive heater portion having a first lead electrically coupled in series with one of said first and second ends of said pilot-switch superconductive wire portion, having a second lead electrically coupled in series with said electrical center of said superconductive magnet coil assemblage, and having a cold resistance value during superconductive operation of said superconductive magnet coil assemblage; and (2) a balance resistor having a cold resistance equal to said cold resistance value and having a first lead portion electrically coupled in series with said second lead of said pilot-switch resistive heater portion.

5. The circuit of claim 4, wherein said quench-protecting means also includes a pair of opposing diodes, said pair of diodes electrically coupled together in parallel and electrically coupled in series between and with generally said electrical center of said superconductive magnet coil assemblage and said pilot-switch resistive heater portion.

6. The circuit of claim 4, wherein said quench-protecting means includes a quench-protection resistive heater disposed proximate said superconductive magnet coil assemblage and electrically coupled in parallel with said pilot-switch superconductive wire portion.

7. The circuit of claim 4, wherein said quench-protecting means includes:

a) a dump-resistor superconductive switch having:

(1) a dump-resistor-switch superconductive wire portion superconductively coupled in series with said superconductive magnet coil assemblage and said pilot-switch superconductive wire portion; and (2) a dump-resistor-switch resistive heater portion disposed proximate said dump-resistor-switch superconductive wire portion and electrically coupled in parallel with said pilot-switch superconductive wire portion; and b) an energy dump resistor electrically coupled in parallel with said dump-resistor-switch superconductive wire portion.

8. The circuit of claim 7, wherein the electrical resistance of said energy dump resistor is greater than the electrical resistance of said dump-resistor-switch resistive heater portion.

\* \* \* \* \*